(No Model.)
W. V. KAY.
BARBED FENCE WIRE.
No. 286,987. Patented Oct. 16, 1883.
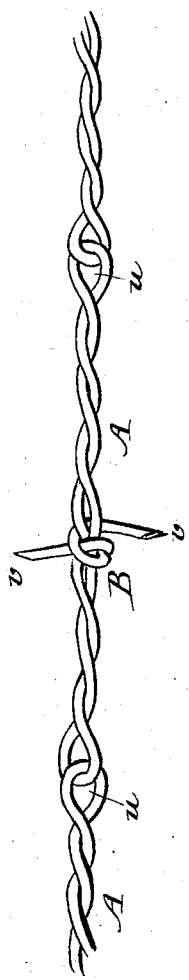
WITNESSES.
F. B. Townsend
L. B. Sheean
INVENTOR-
William V. Kay,
by P. C. Dyrenforth
Attorney

UNITED STATES PATENT OFFICE.

WILLIAM V. KAY, OF WAUKEGAN, ASSIGNOR TO EDWARD M. CRANDAL, OF CHICAGO, ILLINOIS.

BARBED FENCE-WIRE.

SPECIFICATION forming part of Letters Patent No. 286,987, dated October 16, 1883.

Application filed July 30, 1881. (No model.)

*To all whom it may concern:*

Be it known that I, WILLIAM V. KAY, a citizen of the United States, residing at Waukegan, in the county of Lake and State of Illinois, have invented a new and useful Improvement in Barbed Fence-Wire; and I hereby declare the following to be a full, clear, and exact description of the same, reference being had to the accompanying drawing, representing a side view of my improvement.

My invention consists in forming each fence-strand of a series of open wire links connected together, the links and barbs being formed by doubling the wire upon itself at each end, crossing the ends at or near the middle of the link, and then bending them around the link and spreading them to form barbs, all as hereinafter more fully set forth.

In the drawing, A A are the links, which I prefer to twist as shown. The wire forming each link is provided with sharpened ends $v$, and is doubled upon itself each way, the parts bent over being of such length as to cause the sharpened ends to overlap each other over the middle of the link, where they are crossed, and bent around the link to bind the same together, and spread out to form barbs, as shown at B.

Barbed-wire fencing formed in this manner possesses great advantages in the matter of both strength and simplicity of construction.

What I claim as new, and desire to secure by Letters Patent, is—

A fence-wire formed of connected links, each consisting of a wire sharpened at the ends and doubled upon itself from each end of the link, as shown, and with the sharpened ends crossed, bent around the link, and projecting at or near the middle thereof to form barbs, as set forth.

WILLIAM V. KAY.

In presence of—
P. C. DYRENFORTH.
C. C. LINTHICUM.